United States Patent
Broadbent

Patent Number: 6,015,117
Date of Patent: Jan. 18, 2000

[54] VARIABLE CAMBER WING MECHANISM

[76] Inventor: Michael C Broadbent, 1 Johnson Close, Marston Moretaine Beds, United Kingdom, MK43 OJT

[21] Appl. No.: 08/973,260
[22] PCT Filed: Apr. 9, 1997
[86] PCT No.: PCT/GB97/00979
§ 371 Date: Dec. 2, 1997
§ 102(e) Date: Dec. 2, 1997
[87] PCT Pub. No.: WO97/38900
PCT Pub. Date: Oct. 23, 1997

[30] Foreign Application Priority Data

Apr. 13, 1996 [GB] United Kingdom .................. 9607707
Oct. 11, 1996 [GB] United Kingdom .................. 9621194

[51] Int. Cl.⁷ .................................................. B64C 3/50
[52] U.S. Cl. .......................................... 244/214; 244/219
[58] Field of Search .................................. 244/214, 219, 244/216, 213, 218

[56] References Cited

U.S. PATENT DOCUMENTS

| 1,353,666 | 9/1920 | Page ............................................. 244/214 |
| 1,394,344 | 10/1921 | Page ............................................. 244/214 |
| 3,847,369 | 11/1974 | Phillips et al. ............................ 244/42 R |
| 4,360,176 | 11/1982 | Brown ........................................ 244/214 |
| 4,880,189 | 11/1989 | Day ............................................. 244/214 |
| 5,044,580 | 9/1991 | Williams ................................... 244/214 |

FOREIGN PATENT DOCUMENTS

| 0188823 | 7/1986 | European Pat. Off. . |
| 0322172 | 6/1989 | European Pat. Off. . |
| 697606 | 10/1940 | Germany . |
| 298508 | 10/1928 | United Kingdom . |
| 2186849 | 8/1987 | United Kingdom . |
| 2204538 | 11/1988 | United Kingdom . |
| 2260521 | 4/1993 | United Kingdom . |
| 9609955 | 4/1996 | WIPO . |

Primary Examiner—J. Woodrow Eldred
Attorney, Agent, or Firm—Edwin D. Schindler

[57] ABSTRACT

The present invention relates to a variable camber wing mechanism. The mechanism includes a main wing, a slat member connected by swing arm members to the main wing, slots in the leading edge of the main wing for the swing arms to pass through, and a shutter member for sealing the slot around each swing arm member by means of a sliding movement parallel to the leading edge. This sealing of the slots prevents ingress of ice and water into the main wing.

12 Claims, 4 Drawing Sheets

VARIABLE CAMBER WING MECHANISM

The present invention relates to a variable camber wing mechanism and in particular, although not exclusively, to a mechanical system for deploying leading edge lift enhancing surfaces for aircraft or marine craft wings.

Aerodynamics is but one discipline in the field of fluid dynamics and all technology for aerodynamic devices can be easily adapted to hydrodynamic use. In the following description wherever applicable, reference to an aircraft wing is intended to include reference to a marine craft wing.

The main constraints in aircraft design and in particular to the design of aircraft wings are the aerodynamic drag, space and mass (weight) parameters. Wing leading edge design is further constrained by the problems of ice build up, which can in extreme conditions cause the jamming of mechanisms and the failure of components.

A change of wing shape, varying the camber, permits the optimisation, in regard to aerodynamic lift and drag, of a wing section For different flight conditions, in particular, cruise, takeoff and landing.

One form of variable camber device is known as the Variable Camber Kreuger flap system. The aerodynamic surface deploys and unfolds from a position under and behind the D-nose of the wing to a position in front of and below the wing. Various improvements on the Kreuger system have been proposed but these generally require the use of multiple linkages. One such improvement is discussed in U.S. Pat. No. 5,158,252 assigned to The Boeing Company and which discloses a variable camber system having a rotatable drive arm which operates a first and second linkage subassembly.

Another form of variable camber device is known as a slat system. A slat system is disclosed in U.S. Pat. No. 4,753,402 assigned to The Boeing Company and uses a pair of curved tracks to translate and rotate the slat from a retracted position where it rests directly in front of the main wing to a forward and downwardly extended deployed position.

Such known slat and Krueger flap systems have a disadvantage in that their size restricts their usage to certain wing types. For example, supersonic aircraft have thin wings which will not accommodate either slat or Kreuger flap mechanisms. Further, both prior known slat and Kreuger flap mechanisms exhibit inefficient load bearing properties because of their thin vertical cross-sections, while both the Kreuger flap system and traditional slat techniques suffer from high mass and cost.

A disadvantage of the tracked variety of leading edge system is that the track pairs used to move the slats must be interconnected to give redundancy to actuators and to ensure balanced deployment. Considerable care must be exercised in the design of such systems to avoid asymmetric deployment which can cause locking of the mechanism.

Such known slat and Krueger Flap systems suffer from ice ingress as they are not fully sealed against the weather.

It is therefore apparent that a need exists for a compact and simple wing variable camber mechanism that does not increase the profile of the wing during cruise flight and can function whilst one actuator is not working without the need for an interconnecting torque shaft. Such a system must also be structurally efficient so it can bear the aerodynamic loads with minimum mass, and achieve the preferred extension and rotation of the aerodynamic surfaces. Further it must be well sealed from ice ingress and it must achieve the function at low total cost.

It is an object of this invention to provide a variable camber device for aircraft and marine craft wings that mitigates at least some of the disadvantages of the known systems.

According to the present invention there is provided a variable camber wing mechanism comprising a main wing section having a leading edge, a slat member connected by at least two swing arm members to the main wing section, each swing arm member being pivotally connected to the main wing section at a first end thereof and connected to the slat member at a second end thereof and arranged to pass through an opening in the wing leading edge, and sealing means for sealing the opening around the swing arm to prevent ingress of ice and water into the main wing section.

The variable camber wing mechanism uses swing arms to deploy the slat member and the resulting mechanism is simple and compact and does not increase the profile of the wing during cruise flight. The mechanism can function whilst one actuator is not working without the need for an interconnecting torque shaft. The system is structurally efficient and achieves the preferred extension and rotation of the aerodynamic surfaces. The system is also well sealed against ice and water ingress.

Advantageously, the opening in the wing leading edge is in the form of a slot and the swing arm member is arranged for movement along the length of the slot.

Advantageously, the sealing means comprises a shutter member that is connected to the swing arm member and is arranged for movement therewith.

The shutter member may be arranged for movement along the wing leading edge, and is advantageously mounted for sliding movement along the wing leading edge.

The swing arm member may extend through an aperture in shutter member. The shutter member may include at least one sealing element for sealing the aperture around the swing arm member.

Advantageously, the swing arm member is profiled such that its cross-section in the plane of the shutter member is substantially constant. This greatly simplifies the problem of producing a water-tight seal around the swing arm.

Advantageously, each swing arm member is connected by a first pivot bearing at a first end thereof to the main wing section and by a second pivot bearing at a second end thereof to the slat member, the pivot axes of the first and second pivot bearings being non-parallel, whereby rotation of the swing arm member about the first pivot bearing from a retracted position to a deployed position causes translation of the slat member forwards and downwards in relation to the leading edge and rotation of the slat member about an axis that is substantially perpendicular to the direction of flight.

Preferably, the pivot axes of the first and second pivot bearings are substantially perpendicular to the longitudinal axis of the swing arm member.

The second pivot bearing may be connected to the slat member by a rotatable member, for example a swivel bracket.

Advantageously, the axis of rotation of the rotatable member is substantially perpendicular to the direction of flight when the slat member is in a retracted position.

Advantageously, the mechanism includes a rotary actuator that acts on the swing arm to deploy or retract the slat member. Alternatively, linear actuators may be employed.

According to the present invention there is further provided a variable camber wing mechanism comprising a main wing section having a leading edge, a slat member connected by at least two swing arm members to the main wing section, each swing arm member being connected by a first pivot bearing at a first end thereof to the main wing section and by a second pivot bearing at a second end thereof to the slat member, the pivot axes of the first and second pivot bearings being non-parallel, whereby rotation of the swing arm members about the first pivot bearings from a retracted position to a deployed position causes translation of the slat member forwards and downwards in relation to the leading edge and rotation of the slat member about an axis that is substantially perpendicular to the direction of flight.

Embodiments of the invention will now be described, by way of example, with reference to the accompanying drawings, wherein.

Figure 1:
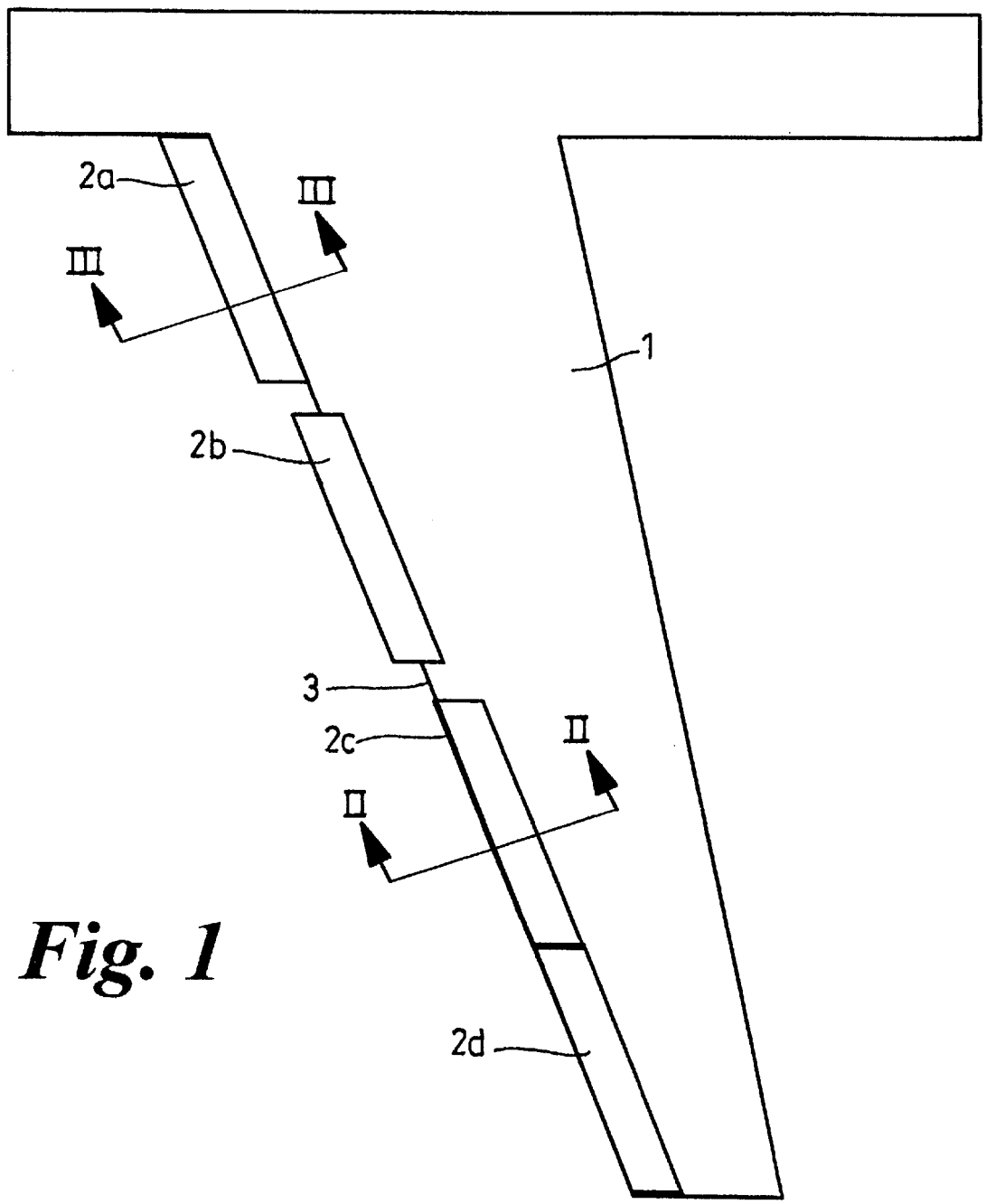
FIG. 1 is a diagrammatic plan view of a wing with four moveable surfaces or slats at the leading edge.

FIG. 1 of the drawings shows an aircraft wing 1 having four slats 2a–2d along its leading edge 3. The innermost slat 2a is shown in a fully deployed position, the next slat 2b is shown partially deployed and the two outer slats, 2c, 2d are shown fully retracted. In practice, all the slats are deployed and retracted synchronously, the slats generally being deployed when the aircraft is taking off or landing and retracted when it is cruising.

The wing 1 has a swept configuration and as the slats are deployed, they are also displaced slightly inwards, towards the root of the wing. This inwards displacement ensures that there is no gap between the innermost slat 2a and the root of the wing when the slats are deployed (which would result if the slats were deployed in a direction perpendicular to the leading edge 3). Avoiding a gap at the root of the wing is important as it here that the lift generated by the wing is greatest. In FIG. 1, small gaps are shown between the two inner slats 2a and 2b, which are shown fully and partially deployed, and between slats 2b and 2c, slat 2c being shown fully retracted. These gaps, which have been greatly exaggerated in the drawing, would be insignificant in practice since all four slats are normally deployed synchronously.

Figure 2:
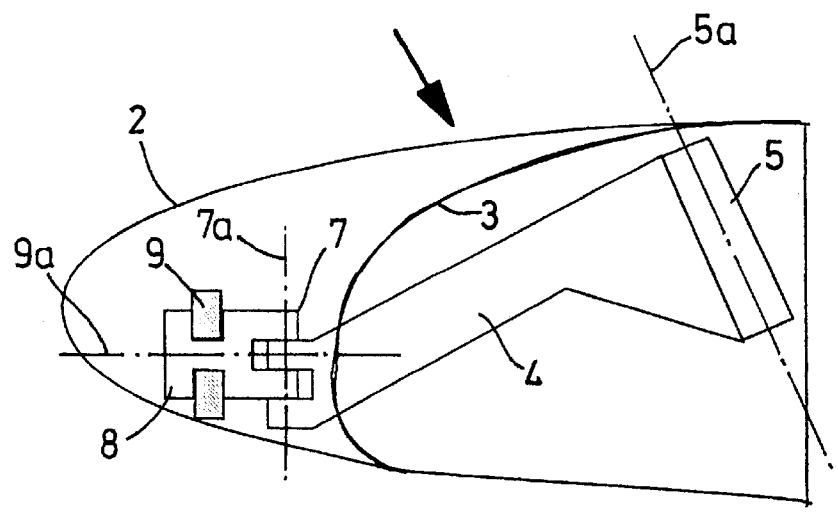
FIG. 2 is a diagrammatic cross-sectional view of a slat in a retracted position, as taken along the line II—II of FIG. 1.
Figure 3:
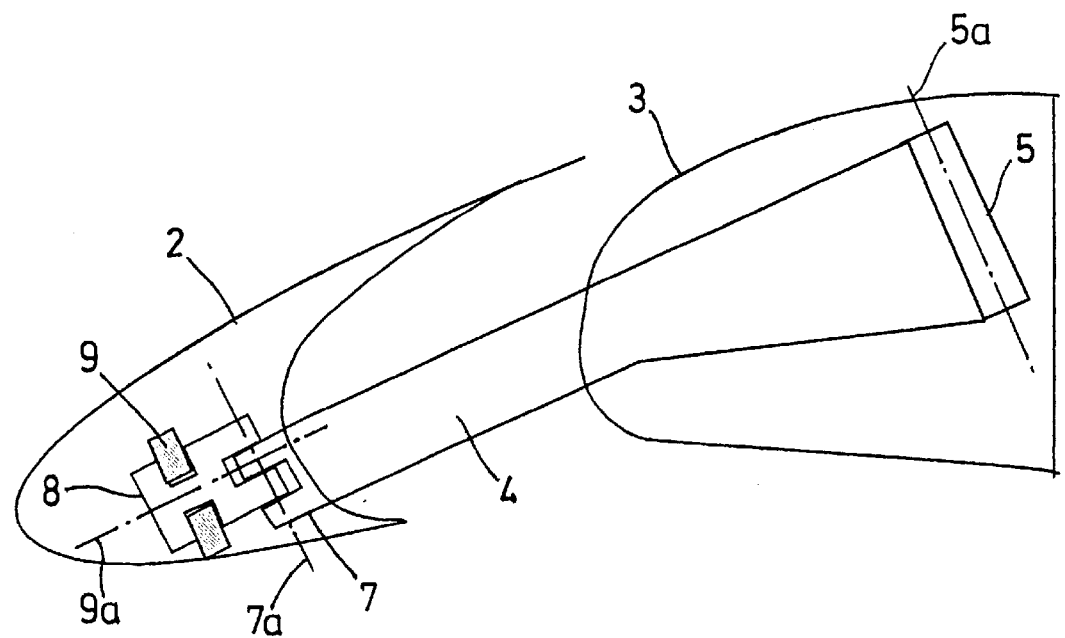
FIG. 3 is a diagrammatic cross-sectional view of a slat, in a deployed position, as taken along the line III—III of FIG. 1.
Figure 4:
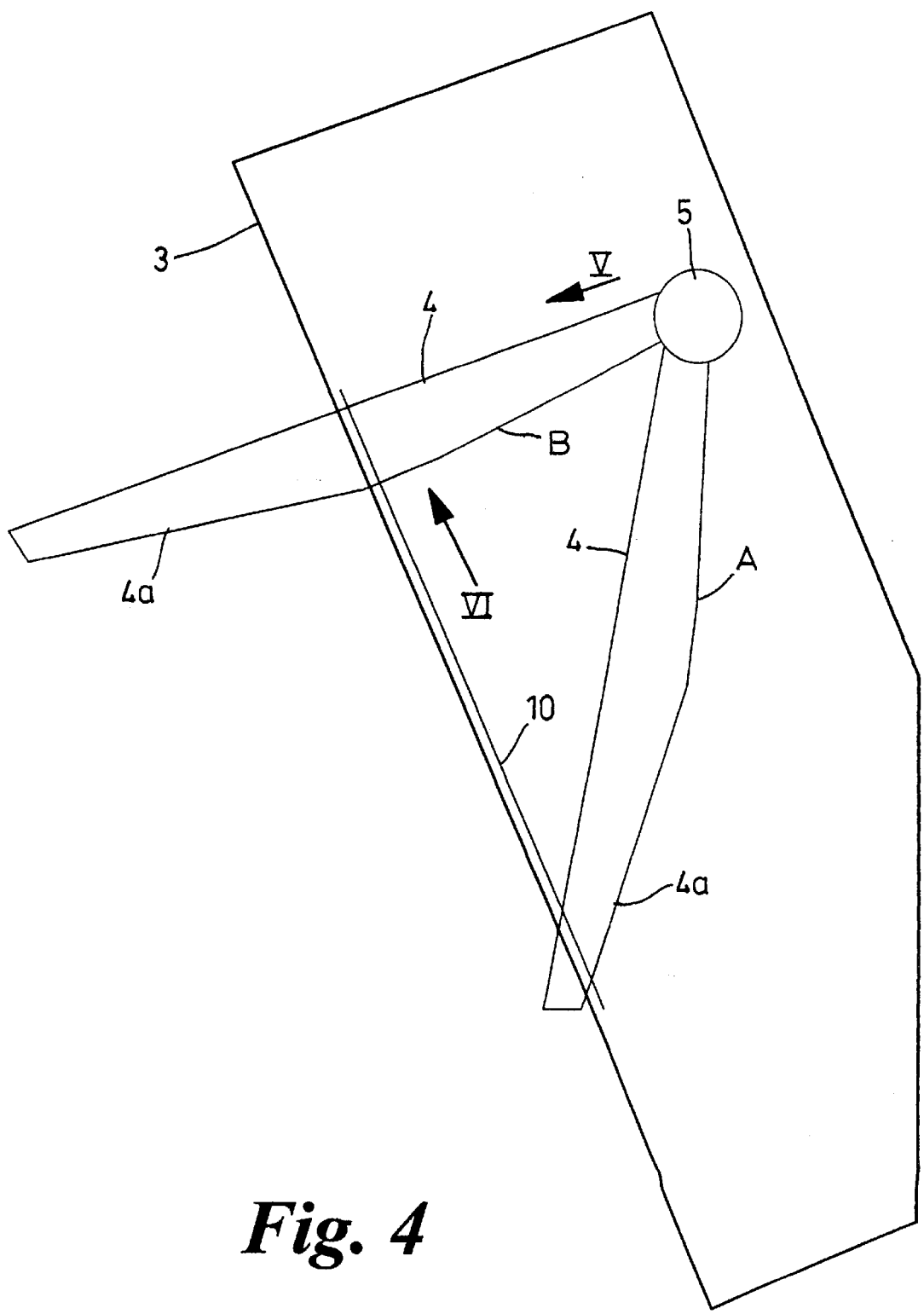
FIG. 4 is a diagrammatic plan view of the slat deployment mechanism, with the top wing skin removed, to show a swing arm in both retracted and deployed positions.

A slat 2 and its associated deployment mechanism is shown in FIGS. 2 to 4. The slat 2 comprises a profiled member that is attached to the leading edge (or D-nose) 3 of the main wing surface 1 by two or more swing arms 4, only one of which is shown. The slat 2 has a convex outer surface and a concave inner surface that matches the profile of the D-nose 3, and which lies flush against the surface of the D-nose when the slat is in the retracted position (as shown in FIG. 2). When the slat 2 is in the deployed position (as shown in FIG. 3), the slat is translated forwards and downwards from the leading edge of the wing and is rotated forwards about an axis that lies below the wing leading edge 3 by an angle of approximately 24° to 27°. In this deployed position, the slat 2 increases the effective camber of the wing, thereby reducing the risk of stalling at low air speeds and high angles of attack.

The slat 2 is connected to the leading edge (or D-nose) 3 of the main wing surface 1 by means of two swing arms 4, of which only one is shown in the drawings. The swing arm 4 is connected to the main wing surface 1 by a first pivot bearing 5, the pivot axis 5a of which lies substantially in a vertical plane that is parallel to the direction of flight and is tilted forwards in that plane by an angle of approximately 22°. The longitudinal axis of the swing arm is substantially perpendicular to the pivot axis 5a. The swing arm 4 is thus mounted for rotation in the plane of a circle that is perpendicular to the pivot axis 5a and which intersects the leading edge 3 of the wing.

Figure 5:
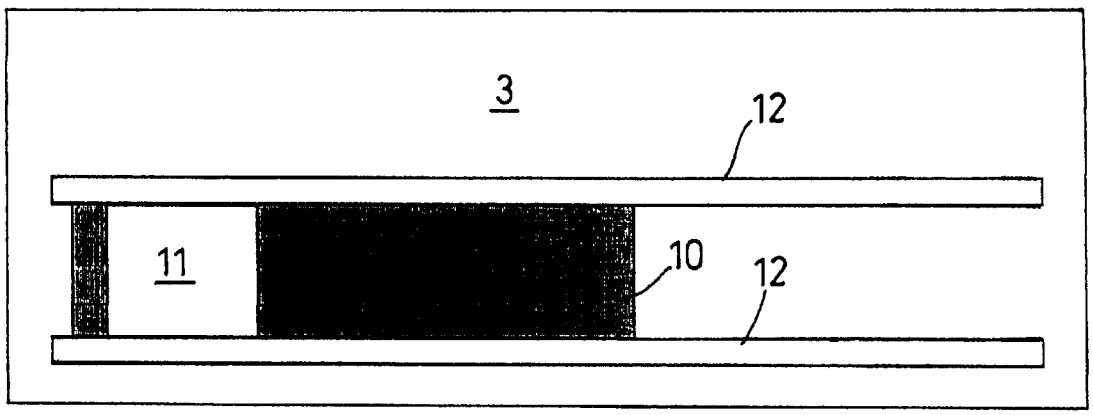
FIG. 5 is a diagrammatic elevation view of a shutter mechanism as seen from within the wing in the direction indicated by arrow V in FIG. 4.
Figure 6:
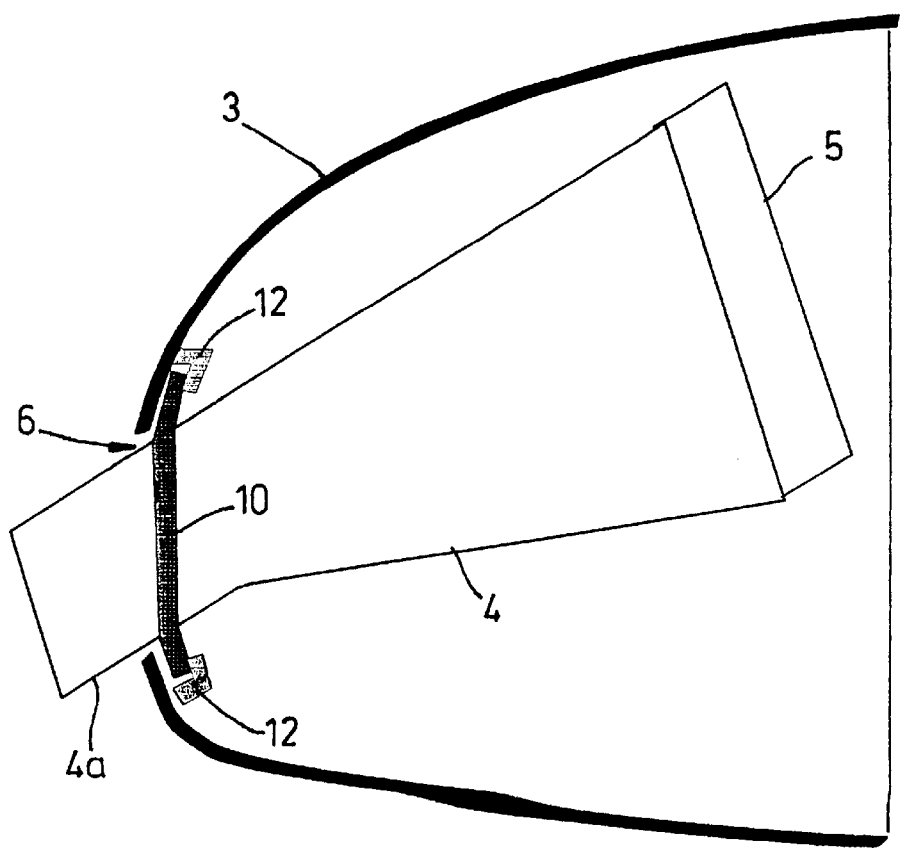
FIG. 6 is an enlarged diagrammatic cross-sectional view of a front portion of the wing, showing part of the slat deployment mechanism, seen in the direction of arrow VI in FIG. 4.

The outer end of the swing arm 4 passes through a horizontal slot 6 in the leading edge of the wing, the slot 6 being shown more clearly in FIGS. 5 and 6. As depicted in FIG. 4, the swing arm 4 may be rotated about the pivot bearing 5 from a retracted position A, in which the longitudinal axis of the arm lies at an acute angle to the leading edge 3 and only the free end of the arm 4 projects beyond the leading edge 3, to a deployed position B in which the longitudinal axis of the arm 4 is substantially perpendicular to the leading edge 3 and an outer part 4a comprising approximately half the length of the arm 4 projects beyond the leading edge 3.

When the swing arm 4 is retracted, as shown in FIG. 2 and at position A in FIG. 4, the arm 4 is contained substantially within the height and width of the main wing section 1, only the endmost part that is connected to the slat 22 projecting forwards of the wing leading edge 3. When the slat is deployed, as shown in FIG. 3 and at position B in FIG. 4, the swing arm 4 extends in front of and below the main wing section 1.

The outer part 4a of the swing arm 4 tapers in width towards the free end of the arm, but is of substantially constant height. The profile of this outer part 4a of the arm is designed so that the cross-section of the arm in the plane of the leading edge 3 is substantially constant. The reason for the profile of the outer part 4a of the swing arm being so designed is discussed in more detail below.

The swing arm 4 is connected at its outer end to the slat 2 by means of a second pivot bearing 7, a swivel bracket 8 and a swivel bearing 9. The axis 7a of the second pivot bearing 7, which connects the swivel arm 4 to the swivel bracket 8, is substantially perpendicular to the longitudinal axis of the swivel arm but is angularly displaced about that axis relative to the axis 5a of the first pivot bearing 5 by an angle of approximately 10°.

The swivel bracket 8, which connects the swing arm 4 to the slat 2, is rotatable within the swivel bearing 9 about a swivel axis 9a that is substantially perpendicular to the axis 7a of the second pivot bearing 7 and, when the slat 2 is in the retracted position as shown in FIG. 2, is substantially parallel to the direction of flight.

Because the axis 7a of the second pivot bearing 7 is angularly displaced relative to the axis 5a of the first pivot 5 about the longitudinal axis of the swivel arm, the slat 2 is caused to tilt forwards through an angle of approximately 24° to 27° as the swing arm 4 is rotated about the first pivot 5 from the retracted position shown in FIG. 2 to the deployed position shown in FIG. 3.

When the slat 2 is in the retracted position, the axis 7a of the second pivot bearing 7 lies in a plane that is substantially perpendicular to the direction of flight, and is tilted outwards at an acute angle to the vertical (assuming the aircraft is in horizontal, level flight). The swivel axis 9a of the pivot bearing 9 is then substantially perpendicular to the direction of flight. When the slat 2 is moved to the deployed position, rotation of the swivel arm 4 about the first pivot bearing 5 causes the axis 7a of the second pivot bearing 7 to precess to a position in which it lies substantially in a vertical plane that is parallel to the direction of flight, and is tilted forwards in that plane by an angle of approximately 24°–27°. The swivel axis 9a of the pivot bearing 9 is thereby tilted downwards relative to the direction of flight by an angle of approximately 24°–27°.

It may thus be seen that as the slat 2 is deployed, it is translated forwards and downwards relative to the leading edge 3 of the wing 1 owing to the effect of the first pivot bearing 5, and rotated about an imaginary horizontal line that is perpendicular to the direction of flight owing to the effect of the second pivot bearing 7 and the swivel bracket 8.

As previously mentioned and as shown in FIGS. 5 and 6, the swing arm 4 extends through a slot 6 in the leading edge or D-nose 3 of the main wing section 1. To prevent ingress of snow and ice into the D-nose 3, the slot 6 is closed by means of a shutter element 10. The shutter element 10 includes an aperture 11 through which the swing arm 4 extends. The aperture is matched substantially to the cross-section of the swing arm in the plane of the leading edge 3 and is provided with sealing members (for example rubber seals, not shown) that form a tight seal around the swing arm 4.

As mentioned above, the outer part 4a of the swing arm 4 is tapered towards its outer end so that the cross-section of the swing arm in the plane of the leading edge 3 is substantially constant. This allows the gap between the arm 4 and the edges of the aperture 11 to be sealed easily. This prevents ingress of snow and ice into the interior of the D-nose 3.

The shutter 10 is mounted for transverse movement along the leading edge of the wing 3 in guides 12 that are mounted above and below the slot 6. The guides 12 and the shutter 10 may be mounted on either the inside of the D-nose (as shown in FIGS. 4 and 6) or the outside (not shown).

The guides 12 may consist of roller bearings or they may consist simply of slideways. In the latter case, the slideways may be coated with an anti-friction coating, for example PTFE, to assist sliding movement of the shutter 10.

Rotation of the swing arm 4 may be achieved by various appropriate means such as are known in the art. For example, the arm 4 may be rotated by means of a rotary actuator acting between the wing and the swing arm. Alternatively, linear actuators may be used, acting either between the wing 1 and the slat 2 or between the wing 1 and the swing arm 4.

Various modifications of the invention are, of course, possible. For example, the second pivot bearing 7, the swivel bracket 8 and the swivel bearing 9 may be replaced by a ball joint, and a strut connected at one end to the slat 2 and at the other end to the swing arm 4 may then be provided for controlling rotation of the slat 2.

It is also possible to use two separate shutters, one being located on each side of the swing arm 4, rather than a single shutter 10 having an aperture through which the arm passes.

I claim:

1. A variable camber wing mechanism, comprising:
    a main wing section having a leading edge;
    a slat member connected by at least two swing arm members to said main wing section, each of said swing arm members being pivotally connected to said main wing section at a first end thereof and connected to said slat member at a second end thereof, and passing through a slot in the leading edge of said main wing section and arranged for pivotal movement along the length of the slot; and,
    a shutter member for sealing the slot around each of said swing arm members for preventing ingress of ice and water into said main wing section, said shutter member being connected to said swing arm members and arranged for sliding movement with said swing arm members along the slot and thereby parallel to the leading edge.

2. A mechanism according to any one of claims 1 in which the swing arm member extends through an aperture in shutter member.

3. A mechanism according to claim 2, in which the shutter member includes at least one sealing element for sealing the aperture around the swing arm member.

4. A mechanism according to any one of claims 1, in which the swing arm member is profiled such that its cross-section in the plane of the shutter member is substantially constant.

5. A mechanism according to claim 1, in which each swing arm member is connected by a first pivot bearing at a first end thereof to the main wing section and by a second pivot bearing at a second end thereof to the slat member, the pivot axes of the first and second pivot bearings being non-parallel, whereby rotation of the swing arm member about the first pivot bearing from a retracted position to a deployed position causes translation of the slat member forwards and downwards in relation to the leading edge and rotation of the slat member about an axis that is substantially perpendicular to the direction of flight.

6. A mechanism according to claim 5, in which the pivot axes of the first and second pivot bearings are substantially perpendicular to the longitudinal axis of the swing arm member.

7. A mechanism according to claim 5 in which the second pivot bearing is connected to the slat member by a rotatable member.

8. A mechanism according to claim 7, in which the axis of rotation of the rotatable member is substantially perpendicular to the direction of flight when the slat member is in a retracted position.

9. A mechanism according to claim 1, including a rotary actuator that acts on the swing arm to deploy or retract the slat member.

10. A variable camber wing mechanism, comprising:
    a main wing section having a leading edge,
    a slat member connected by at least two swing arm members to said main wing member, each of said swing arm members being pivotally connected to said main wing section at a first end thereof and connected to said slat member at a second end thereof, and arranged for passing through an opening in the leading edge of said main wing section; and,
    sealing means for sealing the opening around each of said swing arm members for preventing ingress of ice and water into said main wing section, said sealing means comprising a shutter member that is connected to said swing arm members and is arranged for movement therewith, with said swing arm members extending through an aperture in said shutter member.

11. A mechanism according to claim 10, in which said shutter member includes at least one sealing element for sealing the aperture around said swing arm members.

12. A variable camber wing mechanism, comprising:
    a main wing section having a leading edge,
    a slat member connected by at least two swing arm members to said main wing member, each of said swing arm members being pivotally connected to said main wing section at a first end thereof and connected to said slat member at a second end thereof, and arranged for passing through an opening in the leading edge of said main wing section; and, sealing means for sealing the opening around each of said swing arm members for preventing ingress of ice and water into said main wing section, said sealing means comprising a shutter member that is connected to said swing arm members and is arranged for movement therewith, with said swing arm members being profiled so that their cross-section in the plane of said shutter member is substantially constant.

* * * * *